Feb. 15, 1955  G. A. ARGABRITE  2,701,964
SURFACE THERMOMETER
Filed Aug. 22, 1952
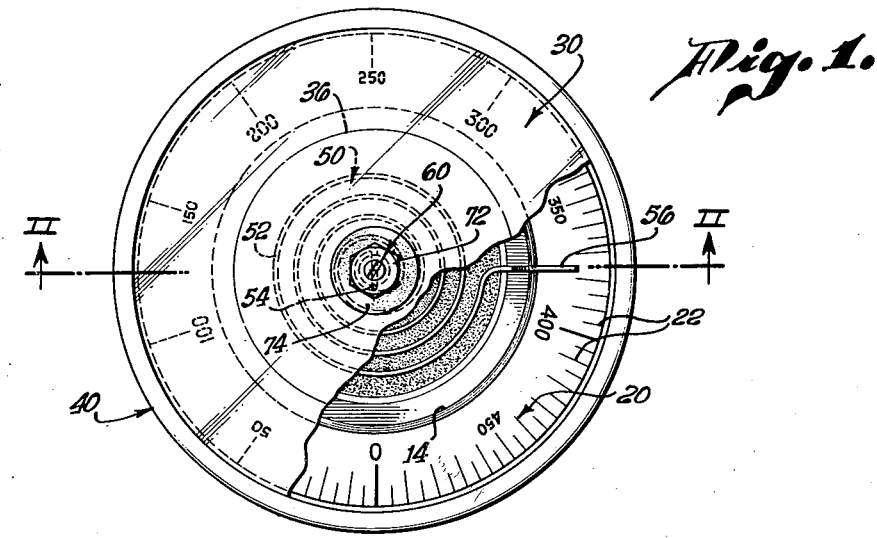
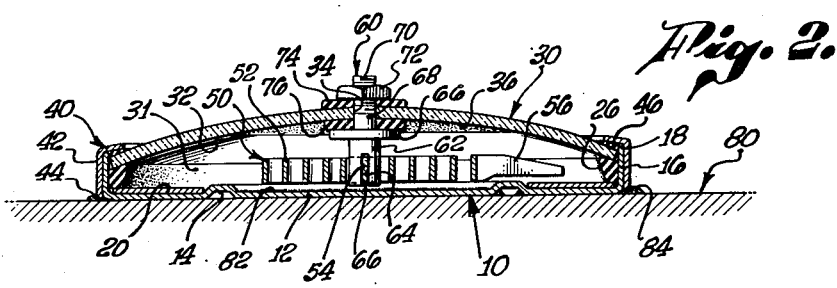
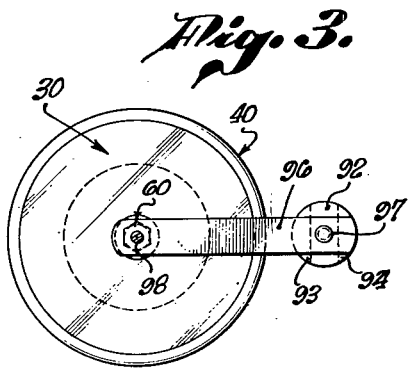
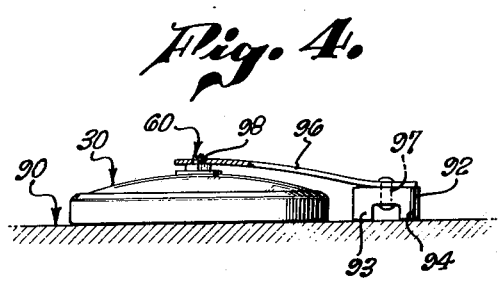
GEORGE A. ARGABRITE,
INVENTOR.
BY
ATTORNEY.

United States Patent Office 2,701,964
Patented Feb. 15, 1955

2,701,964

SURFACE THERMOMETER

George A. Argabrite, North Hollywood, Calif., assignor to Pacific Transducer Corporation, Los Angeles, Calif., a corporation of California Application August 22, 1952, Serial No. 305,810

8 Claims. (Cl. 73—343)

This invention relates generally to temperature indicating meters and particularly describes a novel thermometer for measuring the temperature of a body having a substantially continuous surface, the indicated temperature being virtually independent of ambient air temperature and of incident radiant heat.

As is well known, it is often necessary to determine the temperature of a solid body such as an engine block or the like. Prior devices for this purpose have displayed certain disadvantages and inconveniences in use. For example, a conventional mercury thermometer having an elongated stem bearing a visible scale and having a bulb at one end is sometimes used. The bulb is retained against the surface whose temperature is to be measured by suitable means such as sticky wax or the like. Normally the stem projects outwardly to facilitate reading the indicated temperature. As a result, not only is the thermometer subjected to accidental dislodgment and breakage, but also the accuracy of the reading is adversely affected by ambient air temperature surrounding the stem and by radiant heat impinging the stem.

Electrically actuated temperature measuring devices are also in use, such as thermocouples and temperature sensitive resistors. These devices yield generally satisfactory results but require auxiliary voltmeters, resistance bridges and the like.

The present invention provides a solution to the above problem and in its preferred embodiment takes the form of a circular instrument somewhat resembling a conventional pocket watch in size and shape. The instrument includes a substantially flat base member, preferably circular in shape and made of material having a high heat conductivity such as copper or aluminum. Peripheral side walls are provided, which may be integrally formed with the base member, and constituting an upstanding flange surrounding the base member.

A cover overlies the base member and joins and is supported by the peripheral side walls. The cover is of glass or other transparent material having a low heat conductivity. A portion of the cover is treated to have a high reflectance to incident heat rays as by silvering or similar means. Preferably such treated portion exhibits high heat reflectance in both directions, i. e. to heat rays impinging the cover from both above and below.

The cover, together with the base member and peripheral side walls, constitutes a housing forming a chamber within the named members. A heat responsive means is disposed in the chamber beneath the portion of the cover having high reflectance, the temperature of such means being thereby substantially unaffected by radiant heat originating above the cover. Desirably the heat responsive means may take the form of a bimetallic strip coiled into a spiral concentric with the cover and base member. The inner end of the spiral coil is suitably supported, and the outer end includes a movable indicating pointer. The cover itself may include a centrally disposed aperture, and the inner end of the spiral bimetallic strip may be attached to a support means journalled in the cover aperture, the support means extending through the aperture to facilitate calibration of the instrument after assembly.

A temperature scale is provided on the base member beneath the transparent portion of the cover, and the temperature indicating pointer is arranged to indicate, by its position relative to graduations on the scale, the temperature of the heat responsive means. The pointer may be a radially extending portion of the outer end of the spiral bimetallic strip. The remaining portion of the base member bounding the chamber may be provided with a coating of black material such as lampblack or the like so that heat from an external body or sample on which the base member rests will be transferred to the heat responsive means in the chamber as expeditiously as possible.

It is therefore an object of this invention to disclose a novel thermometer.

Another object is to provide such a device whose temperature reading is substantially unaffected by external heat from sources other than the source to be measured.

Another object is to disclose a thermometer whose heat responsive means is substantially completely shielded from unwanted external radiant heat.

A further object is to disclose improved calibration means for a device of the above character.

Still another object is to provide a thermometer having the advantages referred to which is exceptionally reliable as to accuracy and yet comparatively inexpensive to manufacture.

These and other objects, purposes and advantages of the invention will become clear from a study of the following description of a preferred embodiment thereof taken in connection with the accompanying drawing, in which:

Fig. 1 is a plan view of one form of a thermometer embodying my invention with a portion of the cover broken away.

Fig. 2 is a sectional view taken on line II—II of Fig. 1.

Fig. 3 is a plan view of the instrument of Figs. 1 and 2, together with magnetic retaining means for holding the instrument in desired position.

Fig. 4 is a side elevational view of the devices of Fig. 3.

Referring now in particular to Figs. 1 and 2, the present invention includes a base member indicated generally at 10 having a substantially flat bottom 12 made of thin material having high heat conductivity such as aluminum or copper. When the base member is circular in shape, as in the illustrated embodiment, I may provide a concentric deformed corrugation 14 in the bottom to afford added strength to the base member. Upstanding peripheral side wall 16 forms, with the bottom 12, a shallow cup-shaped member, and side wall 16 is desirably continuous and integral with bottom 12.

A temperature scale or dial 20 bearing graduations 22 rests upon base member 10. In the circular form of thermometer shown, the temperature scale is annular in shape and is concentric with base member 10.

Spacing, sealing and retaining means are provided above temperature scale 20 and immediately adjacent side wall 16. Such means preferably take the form of a resilient O-ring 26, and it will be noted that O-ring 26 serves to retain temperature scale 20 in position.

A cover indicated generally at 30 overlies bottom member and is spaced therefrom, the periphery of cover 30 being in continuous contact with O-ring 26 and flanged side wall 16. Cover 30 is transparent and is desirably made of glass having a low coefficient of heat conductivity or of other material having similar physical properties. Cover 30 may be made dish-shaped in form, with its concave surface 32 facing base member 10.

An annular retaining ring indicated generally at 40 overlies the periphery of cover 30 and includes a downwardly depending flanged sidewall 42. Side wall 42 fits snugly outside the flanged side wall 16, and the lowermost margin 44 of depending side wall is peened inwardly as shown beneath the outer margin of base member 10 to retain base member 10, O-ring 26 and cover 30 in assembled relation. A resilient sealing ring 46 extends between retaining ring 40 and cover 30 to provide a substantially hermetic seal. It will be of course understood that the particular construction shown, including retaining ring 40, is not necessary in every detail for satisfactory operation of the invention. For example, retaining ring 40 may be eliminated and the parts then held in assembled relation by crimping or peening the uppermost margin 18 of side wall 16 inwardly over the periphery of cover 30.

Within the chamber 31 formed by base member 10 and cover 30 there is disposed a heat responsive means indicated generally at 50 and in the present embodiment comprising a bimetallic strip formed into a spiral coil 52. The metals constituting coil 52 are so chosen as to have different temperature coefficients of expansion so that, in accordance with well known principles, the strip will tend to tighten or loosen its spiral coil in response to changes in its temperature. In the present illustration the bimetallic strip is arranged to loosen its coil upon an increase of its temperature. Under such conditions, if the inner end of the coil is fixed, the outer end will move clockwise as viewed in Fig. 1.

Means are provided for supporting one end of spiral coil 52. In the illustrated embodiment, such means include an aperture 34 formed in cover 30 and a support post or stud indicated generally at 60 extending through aperture 34. Post 60 includes a lower portion 62 having a vertical slot 64 formed therein. A radial flange or shoulder 66 extends outwardly above lower portion 62, and stud 60 terminates upwardly in a threaded shank 68 journaled in aperture 34 of cover 30. An adjusting slot 70 is formed in the upper end of threaded shank 68, and a locking nut 72 is in threaded engagement with shank 68. A pair of apertured resilient washers 74 and 76 are carried on stud 60, one above and one below cover 30, in order to prevent chipping or breaking of cover 30 when locking nut 72 is tightened.

At the inner end of coil 52 is a short straight leg 54 which is received in slot 64 and held therein as by spot-weld 66 or other suitable means. Thus, when nut 72 is tightened on threaded shank 68, the inner end 54 of coil 52 is fixed relative to cover 30.

A temperature indicating pointer 56 is carried on the outer end of coil 52. Pointer 56 is preferably merely a short straightened portion of coil 52, and projects radially outwardly therefrom, extending over at least the inner circumferential portion of annular temperature scale 20. As will be evident from the drawing and the above description, pointer 56 indicates, by its position relative to the graduations 22 of scale 20, the temperature of heat responsive means 50 within the chamber 31 formed by base member 10 and cover 30.

Means are provided for minimizing the passage of unwanted heat into the chamber from foreign sources and also for facilitating the passage of heat into chamber 31 from the surface of a body whose temperature is to be measured. The portion 36 of cover 30 overlying heat responsive means 50 is silvered or otherwise treated to have a high reflectance, such high reflectance being exhibited to heat rays moving either upwardly or downwardly as viewed in Fig. 2. It is assumed in Fig. 2 that the thermometer is resting upon a body indicated generally at 80 whose temperature is to be measured. A portion of the radiant heat emitted by the sample or body 80 and moving upwardly will be reflected by the portion 36 of cover 30, and such heat rays will therefore in great measure be retained within chamber 31 and in heat transfer relation with heat responsive means 50. It will be noted that the portion 36 of high reflectance overlies all of heat responsive means 50 with the exception of a negligible part of indicating pointer 56.

Since the silvered portion 36 of cover 30 exhibits high reflectance to incident unwanted heat rays from foreign sources above the thermometer as viewed in Fig. 2, such incident heat rays are virtually completely reflected, and therefore have no effect upon the temperature of heat responsive means 50. Temperature scale 20 is predominantly light in color, only the graduations 22 being somewhat different in color to facilitate reading. Hence any radiant heat rays from an unwanted source, having traversed the transparent portion of cover 30, will impinge scale 20 and in large part will be reflected back out of chamber 31.

In order to facilitate the passage of heat from sample 80 to chamber 31 and heat responsive means 50, the upper surface of bottom 12, beneath heat responsive means 50, is provided with a dull black coating 82 such as lamp-black or the like so that such coated portion approaches an ideal black body as a heat emitter. As heretofore described, the bottom 12 is relatively thin and is preferably made of material having high heat conductivity. Thus when bottom 12 is placed upon a sample, as 80, the bottom 12, by heat conduction, quickly reaches the temperature of the sample, and since its upper surface is an efficient emitter, radiant heat from the bottom is rapidly transferred to chamber 31 and heat responsive means 50, being almost wholly retained within the chamber by reason of the silvered coating 36 on cover 30.

In order to retain the thermometer on the surface of a sample against accidental dislodgement, I may use a very thin layer of suitable wax or grease 84 between the sample and the bottom of base member 10. Silicon grease, for example, is excellent for the purpose since it is tenacious enough to hold the thermometer in position, it has relatively high heat conductivity, and its viscosity and adhesive ability are substantially unaffected by temperature.

In Figs. 3 and 4 is shown an alternative means for retaining the thermometer in place on a paramagnetic or ferromagnetic sample 90. A small permanent magnet 92 having magnetic poles 93 and 94 is provided with an outwardly extending arm 96 attached thereto by suitable means such as rivet 97. Arm 96 may be somewhat resilient, and an aperture 98 is formed in its outer end. The aperture engages the upper end of the support post or stud 60 so that the base member 10 is held in firm contact with sample 90. The device may be easily adjusted as to location or removed entirely from sample 90 by moving magnet 92 as desired.

If the instrument falls out of calibration by a substantially constant amount throughout its range, it may easily be returned to correct calibration. The instrument is placed upon a body or sample whose temperature is known. Nut 72 is loosened and support stud 60 is rotated by means of a screwdriver or similar tool in slot 70. Indicating pointer 56 is thereby brought to the correct reading on scale 20, and nut 72 is then tightened.

Accordingly it will be seen that I have provided a novel and highly useful thermometer for measuring the temperature of a body having a surface extending over an appreciable area. Although the particular embodiment herein described and illustrated has a flat, substantially planar bottom and is used to measure the temperature of a surface having a similar conformation, nevertheless it will be obvious that the temperature of a body having any configuration may be measured. It is only necessary that the bottom of the thermometer be similarly shaped so that it may engage the surface of the sample fairly closely. Thus thermometers having spherical or cylindrical bottoms, either concave or convex, are within the contemplation of the present invention.

Similarly, the inner end of the bimetallic spiral coil 52 need not be suspended from the cover 30. Instead, a support stud or post may be journaled in the base member and project upwardly therefrom, the inner end of the coil being fixed to the upper portion of such stud. It is not necessary that cover 30 be made concave, as herein shown, although I prefer that construction, in conjunction with the silvered portion 36, as efficiently shielding the heat responsive means 50 from unwanted radiant heat.

Other modifications and changes from the specific embodiments herein shown and described may be made without departing from the spirit of the invention, and all such changes and modifications are intended to be embraced within the scope of the appended claims.

I claim:

1. A thermometer for indicating the temperature of the surface of a body, the indicated temperature being virtually independent of foreign radiant heat and ambient air temperature, comprising: a cup-shaped base member of relatively high heat conductivity and having an upstanding flanged side wall; a transparent centrally apertured cover overlying said base member and forming therewith an enclosed chamber, the periphery of the cover engaging said side wall, said cover made of material of relatively low heat conductivity; a support stud engaging said aperture and extending therethrough into said chamber; heat responsive means disposed within said chamber including a bi-metallic spiral coil having its inner end fixed to the lower end of the stud and being supported thereby and its outer end extending radially outwardly from the coil and constituting an indicating pointer; an annular temperature scale carried by said base member and underlying said pointer; and means carried by said cover and overlying said spiral coil for shielding the coil from radiant heat originating above the cover.

2. A thermometer as stated in claim 1, wherein the cover is circular and dish-shaped, and the shielding means includes a circular coating of high reflectance material on the cover.

3. A thermometer comprising: a substantially flat base member of material having high heat conductivity, and including an upstanding peripheral side wall; a temperature scale on the upper surface of the base member; a transparent apertured cover overlying said base member and forming with the base member and side wall an enclosed chamber, said cover including a portion having a high reflectance to heat rays impinging said portion; a support stud journaled in the aperture and means for clamping said stud in a selected angular position relative to the cover; and heat responsive means within said chamber and supported by said stud, said heat responsive means including temperature indicating means movable relative to said scale in response to temperature change of said heat responsive means.

4. A thermometer comprising: a base member having a thin bottom of high heat conductivity and an upstanding peripheral side wall; a centrally apertured transparent cover engaging and supported by said wall, the cover being spaced above the base member to provide a chamber therebetween; support means engaging the aperture and extending into said chamber; a temperature scale on said base member; and heat responsive means in said chamber and carried by said support means including an indicating pointer movable relative to said scale in response to change in temperature of said heat responsive means, the portion of said bottom underlying the heat responsive means being virtually a black body.

5. A thermometer as stated in claim 4, wherein said heat responsive means is centrally disposed in said chamber and the central portion of said cover, overlying the heat responsive means, includes a coating of material having high reflectance to impinging heat rays.

6. A thermometer as stated in claim 4, wherein the support means includes a stud journaled in the aperture and extending thereabove, and including magnetic retaining means comprising a permanent magnet and an arm fixed thereto, said arm being provided with an aperture formed therein adapted to engage the upper end of said stud.

7. A thermometer comprising: a base member having a thin bottom of high heat conductivity and an upstanding peripheral side wall; a transparent cover engaging and supported by said wall, said cover constituting with said base member a substantially cylindrical housing enclosing a chamber and provided with an axially disposed aperture formed therein; support means journaled in said aperture and extending into said chamber; a temperature scale on said base member; and heat responsive means in said chamber and carried by said support means including an indicating pointer movable relative to said scale in response to change in temperature of said heat responsive means.

8. A thermometer as stated in claim 7, wherein said heat responsive means is centrally disposed in said chamber and the central portion of said cover, overlying the heat responsive means, includes a coating of material having high reflectance to impinging heat rays.

References Cited in the file of this patent

UNITED STATES PATENTS

| | | |
|---|---|---|
| 1,528,082 | Schlaich | Mar. 3, 1925 |
| 2,417,860 | Cline | Mar. 25, 1947 |

FOREIGN PATENTS

| | | |
|---|---|---|
| 10,173 | Great Britain | Apr. 30, 1908 |
| 155,156 | Switzerland | Aug. 16, 1932 |
| 893,843 | France | Feb. 28, 1944 |